F. T. BRADY.
DIFFERENTIAL HOUSING TRUSS.
APPLICATION FILED JUNE 24, 1916.
1,227,378.
Patented May 22, 1917.
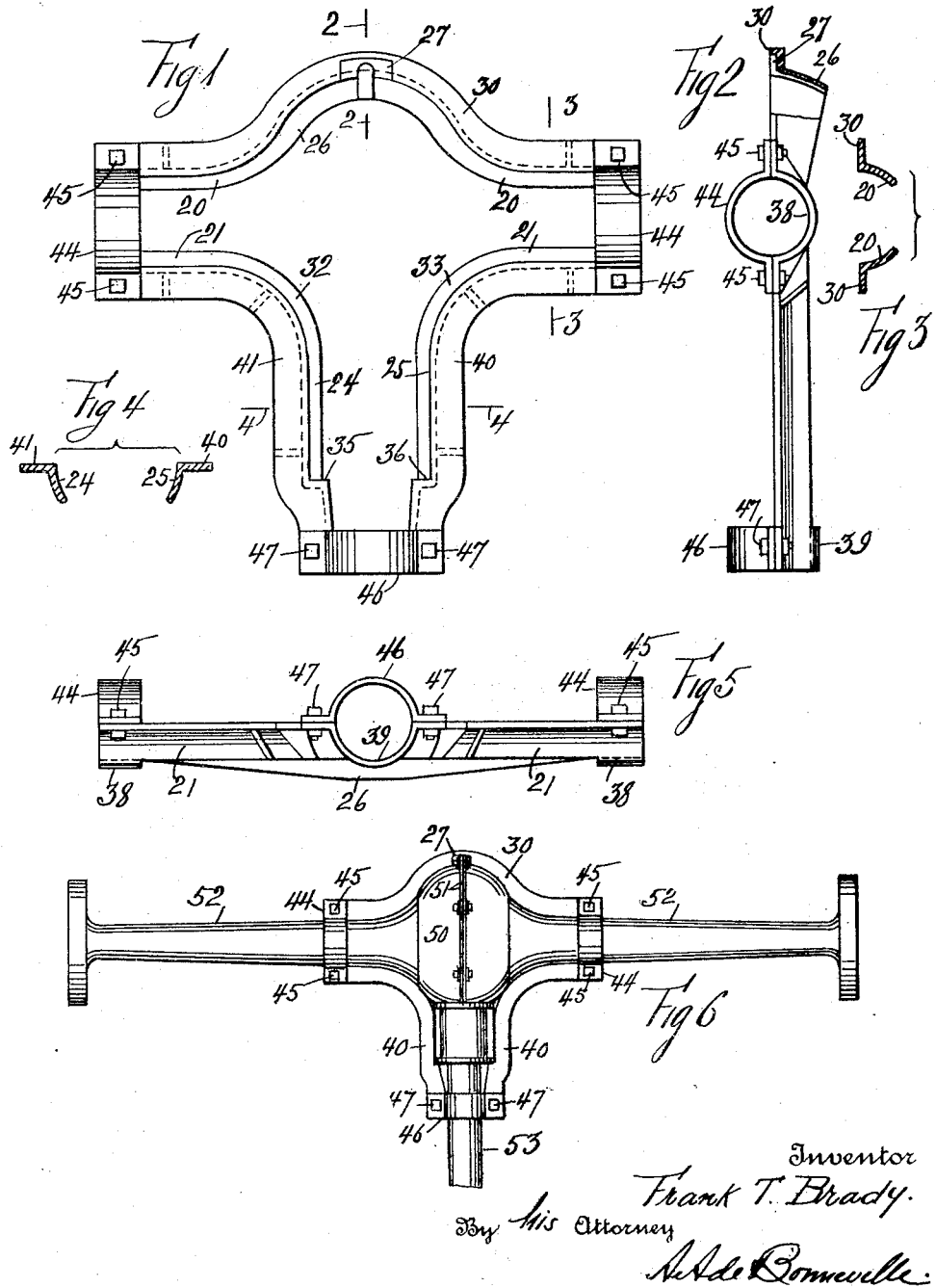
Inventor
Frank T. Brady.
By his Attorney

UNITED STATES PATENT OFFICE.

FRANK T. BRADY, OF BAYONNE, NEW JERSEY.

DIFFERENTIAL HOUSING-TRUSS.

1,227,378.  Specification of Letters Patent.  Patented May 22, 1917.

Application filed June 24, 1916. Serial No. 105,568.

*To all whom it may concern:*

Be it known that I, FRANK T. BRADY, a citizen of the United States, and a resident of Bayonne, in the county of Hudson and State of New Jersey, have invented certain new and useful Improvements in Differential Housing-Trusses, of which the following is a specification.

This invention relates to a differential housing truss, which is applicable to motor vehicles or the like. Its object is to maintain the detachable members of the housing in contact with each other when subjected to severe strains. It also maintains the proper alinement of the members of the axle tubes connected to the said housing, and maintains the shaft tube in proper alinement and at right angles to the members of the axle tubes.

In the accompanying drawings Figure 1 represents a top plan view of an exemplification of the differential housing truss; Fig. 2 shows a right hand side view of Fig. 1 with a section thereof on the line 2, 2; Fig. 3 is a section of Fig. 1 on the line 3, 3; Fig. 4 represents a section of Fig. 1 on the line 4, 4; Fig. 5 shows a front view of Fig. 1 and Fig. 6 shows a top plan view of the invention on a reduced scale and connected to the axle tubes and shaft tube of an automobile.

The truss is shown to comprise two pairs of concaved parallel arms 20, 21, the corresponding members of one pair of which are in line with the corresponding members of the other pair, and a pair of concaved parallel arms 24, 25. The latter are at right angles to the pairs of arms 20, 21. The arms 20 are connected by the concaved connecting portion 26. A normally horizontal flange 30 is formed with the portion 26 and arms 20. An indentation 27 is formed in the portion 26 and flange 30. A curved concaved connecting portion 32 connects one of the arms 21 with the arm 24 and a curved concaved connecting portion 33 connects the other arm 21 with the arm 25. A shoulder 35 is formed with the arm 24, and a shoulder 36 is formed with the arm 25. Each of the pairs of arms 20 and 21 are made integral by the curved connecting braces 38. A normally horizontal flange 40 is formed with one of the arms 21, the arm 25 and portion 33, and a normally horizontal flange 41 connects the other arm 21, the arm 24 and the portion 32. Caps 44 with the bolts 45 connect each pair of arms 20, 21 and a cap 46 with the bolts 47 connects the arms 24, 25.

Referring to Fig. 6 the differential housing 50 with the flanges 51, the tapered axle tubes 52 and the shaft tube 53 are represented with the improved truss clamped thereto. The rear portions of the flanges 51 of the said housing are seated in the indentation 27 of the portion 26 and flange 30. The concaved face of the portion 26 supports said housing, and the concaved faces of the portions 32 and 33 also support said housing. The tubes 52 are clamped in the curved connecting braces 38 and caps 44, and the shaft tube 53 is clamped in the connecting brace 39 and the cap 46.

It will be noted that the truss is made of a single or integral piece of material with the caps 44 and 46. The tapering portions of the tubes 52 prevent the lateral movement of the truss in the direction of the longitudinal axis of said tubes 52, and thereby the spreading of the members of the housing 50 is prevented. The fixed position of the brace 39 relatively to the braces 38 maintain the tubes 52 at right angles to the tube 53. By this means the gears in the housing are maintained in proper position and mesh and the members of the axle in the tubes 52 and the shaft in the tube 53 also are maintained in proper position.

Having described my invention what I desire to secure by Letters Patent and claim is:

1. A truss of the character described comprising two pairs of concaved parallel arms, the corresponding arms of said pairs of arms in line with each other, curved connecting braces for each pair of arms, a connecting portion for one of the arms of each pair, a third pair of concaved parallel arms at right angles to the other arms, a curved concaved connecting portion between each of the third pair of arms and one of the members of the first and second pair of arms, a curved connecting brace for the third pair of arms, and a detachable cap for each pair of arms.

2. In a truss of the character described the combination of two pairs of arms, a cap for each pair of arms to connect them to the axle tubes of a vehicle, a third pair of arms in the truss at right angles to the other arms and a cap for the latter arms to connect them to the shaft tube of a vehicle.

3. In a truss of the character described the combination of two pairs of arms, a connecting portion for one of the arms of each pair, a third pair of arms at right angles to the other arms, connecting portions between the latter arms and one of each of the pairs of other arms, the connecting portions curved to support a housing, and a cap for each pair of arms, to connect the first two pairs of arms to the axle tubes of a vehicle and to connect the latter pair of arms to the shaft tube of said vehicle.

Signed at Bayonne, in the county of Hudson and State of New Jersey, this 13th day of June, A. D. 1916.

FRANK T. BRADY.

Witnesses:
A. A. DE BONNEVILLE,
W. E. DE BONNEVILLE.

Copies of this patent may be obtained for five cents each, by addressing the "Commissioner of Patents, Washington, D. C."